Nov. 28, 1944.  C. J. FROSCH  2,363,581
POLYESTERS
Filed July 11, 1941
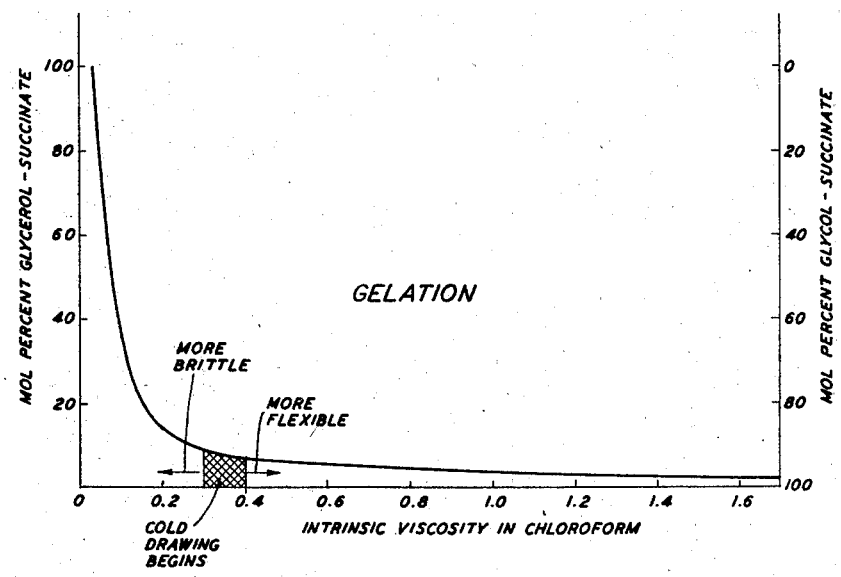
INVENTOR
C. J. FROSCH
BY
ATTORNEY Patented Nov. 28, 1944

2,363,581

UNITED STATES PATENT OFFICE 2,363,581

POLYESTERS

Carl J. Frosch, Summit, N. J., assignor to Bell Telephone Laboratories, Incorporated, New York, N. Y., a corporation of New York Application July 11, 1941, Serial No. 401,958

4 Claims. (Cl. 260—75)

The present invention relates to polyesters of high molecular weight. It relates further to mildly cross-linked polyesters of high molecular weight, particularly those prepared by adding a small percentage of a compound having more than two functional groups to the reaction mixture of bifunctional compounds from which micro-crystalline linear polyesters of high molecular weight are normally prepared.

Linear polyesters of high molecular weight particularly those having a molecular weight sufficiently high to permit cold drawing as described, for instance, in U. S. Patent 2,071,250 have been found useful for many purposes because of their outstanding toughness and their ability to be drawn into oriented fibers of considerable strength. These are micro-crystalline materials which possess definite crystalline melting points and which melt sharply to form relatively fluid liquids. Such polyesters are prepared by the prolonged heating of bifunctional compounds having ester forming functional groups under conditions such that the water of reaction is removed from the reaction mixture sufficiently completely to permit the reaction to run as near to complete esterification as is desired. Such linear polyesters are prepared by the reaction of glycols with dicarboxylic acids or by the auto-esterification of hydroxy acids. The water of reaction may be removed by the use of a molecular still, by bubbling an inert gas, such as dry, oxygen-free hydrogen or nitrogen through the reaction mixture with or without the application of a vacuum or by continuously stirring the reaction mixture under a vacuum into a foam having a large surface area. If the proper reactants are chosen, micro-crystalline polymers are produced. If the reaction is carried to a point where the molecular weight of the polyesters is sufficiently high, relatively tough micro-crystalline polymers possessing the property of cold drawing are produced. The property of cold drawing appears in polyesters at molecular weights of about 8,000 to 10,000 as determined by the Staudinger viscosity method but really tough compounds are produced only at considerably higher molecular weights which are more difficult to obtain.

It is an object of the present invention to decrease the reaction time necessary for the production of polyesters possessing the property of cold drawing and to produce tougher and more permanently flexible polyesters.

It is a further object of the present invention to produce polyesters which may be caused to crystallize more rapidly when cooled from a molten state to below the crystalline melting point.

These objects are achieved by heating bifunctional compounds capable of forming micro-crystalline linear polyesters in the presence of a limited amount of a compound having more than two functional groups, each of which is capable of forming a condensation linkage with a hydroxyl group or a carboxyl group. In general, the functional groups of the added polyfunctional compound should consist of hydroxyl groups, carboxyl groups or primary or secondary amino groups.

Thus, a mixture of a slight excess of a glycol with a dicarboxylic acid capable of forming a micro-crystalline linear polyester may be subjected to the polyester forming conditions outlined above, together with a small percentage of a compound having a functionality greater than two, such as glycerol, tricarballylic acid, diethanolamine, triethanolamine or a triamine, such as diethylene triamine. Similar results can be obtained by adding a small percentage of a similar polyfunctional compound to a hydroxy acid capable of forming a micro-crystalline linear polyester and subjecting the mixture to polyester forming conditions, the added polyfunctional compound being suitably compensated by the addition of a complementary difunctional reactant.

In the reactions of the present invention the time required to produce a polyester possessing the property of cold drawing is considerably less than the time required to produce polyesters having this property from a similar mixture of bifunctional compounds containing no added compounds having a functionality greater than two. This result is apparently due to the fact that the presence of a polyfunctional compound in effect builds up longer essentially linear molecules so that the rate of production of molecules having a given effective length is considerably increased.

The products of the present invention are more permanently flexible and tougher than the strictly linear polyesters produced from the same bifunctional compounds and they are more resistant to abrasion either in their free state or when impregnated in fibrous bodies such as textile fabrics.

Moreover, the supercooling properties of the polyesters of the present invention render them valuable for many purposes. Although the majority of the strictly linear polyesters crystallize fairly rapidly when cooled from the molten state, certain others do not crystallize immediately upon cooling below their crystalline melting points but pass from the amorphous to the crystalline state over a period of time. In the latter class lie the most available and cheapest polyesters, namely polyethylene succinate and polyethylene adipate. The property of supercooling possessed by these polyesters is of considerable disadvantage for certain uses such as the coating of wire, where the rate of coating must be restricted to allow crystallization before the coated wire is passed onto reels.

Although the incorporation of a polyfunctional compound according to the present invention increases the supercooling range of the polyesters into which it is incorporated, nevertheless the resulting polymers in the supercooled state possess the property of having their crystallization accelerated when they are subjected to mechanical working. Thus by incorporating a small amount of a polyfunctional compound in polyethylene succinate or polyethylene adipate and subjecting them to mechanical working they can be made to crystallize more rapidly than when they contain no polyfunctional compound. In a wire coating process where the wire is coated with polymer and then passed through a wiping die, passage through the die is sufficient to initiate crystallization in such polyesters containing a polyfunctional compound. The speed of wire coating may, therefore, be increased with the polymers of the present invention.

The effect of mechanical working in initiating crystallization is enhanced when the polymer contains substantial amounts of pigment or other dispersed particles.

This property of the polymers of the present invention also suits them very well for the carrying out of a molding process such as that described in the copending application of C. S. Fuller, Serial No. 401,955, filed July 11, 1941. In such a molding process, masses of supercooled polymers are subjected to a pressure molding or stamping procedure, in which the mechanical working incident to the molding causes accelerated crystallization of the mass of polymer. Solidification therefore takes place very rapidly so that it is not necessary to wait for the cooling of the body in the mold. Since the polymers of the present invention have increased supercooling range and have their rate of crystallization accelerated by mechanical working, particularly when they contain pigments, many of them are very well suited for such a process. Moreover they are somewhat more viscous than the corresponding strictly linear polyesters and are therefore more easily charged into the mold.

As stated above in the preparation of the polyesters of the present invention it is necessary that the amount of added compound having more than two functional groups be carefully limited. If too large an amount of polyfunctional compound is present, cross-linking proceeds so rapidly that the substance sets to a gel before the esterification can proceed to a point at which molecular chains of the desired length are produced. Once the material gels, further esterification is so retarded due to the immobility of the reaction mixture that a cold drawing polyester cannot be produced in a finite time. On the other hand, with a properly limited amount of polyfunctional compound the cross-linking reaction proceeds sufficiently slowly to permit a very high degree of esterification to be achieved even considerably higher than that required for the incidence of cold drawing. In order for the property of cold drawing to be obtained it is necessary that the esterification proceed beyond 98 per cent of the theoretically complete esterification of the reaction mixture.

This may be illustrated by reference to the accompanying drawing which shows a curve representing the intrinsic viscosity at which the reaction mixture sets to a gel when it contains varying amounts of a compound having a functionality greater than two.

In order to derive the curve shown in the drawing a reaction mixture of succinic acid, ethylene glycol and glycerol containing slightly less succinic acid than that theoretically required for complete esterification of the glycol and glycerol was heated at 250° C. while continuously bubbling dry, oxygen-free hydrogen through the mixture. This procedure was continued for thirty hours unless gelation occurred before this time. This procedure was repeated utilizing various reaction mixtures in which the mol per cent of glycerol was varied between 0 per cent and 100 per cent of the total glycerol and glycol. Samples of the reaction mixtures were withdrawn periodically prior to gelation and their intrinsic viscosity in chloroform was measured. The intrinsic viscosity at incipient gelation was noted in each case. The curve of the drawing was drawn from the plotted results of these tests and shows the intrinsic viscosity which it was possible to reach with each reaction mixture before gelation occurred. The intrinsic viscosity is an indication of the average molecular weight of the polyester. The property of cold drawing ordinarily appears in polyesters at intrinsic viscosities between about 0.3 and 0.4. The toughness and flexibility increase as the intrinsic viscosity is raised above this region.

It can be seen from the curve that when glycerol and succinic acid alone are reacted together, esterification can proceed only to the point at which the intrinsic viscosity is about .03 before gelation of the mixture occurs. It can be seen further that even when as much as 90 mol per cent or more of the glycerol is replaced by ethylene glycol in the initial reaction mixture gelation occurs before intrinsic viscosities even approaching the cold drawing point are reached. When the mol percentage of glycerol is reduced to below about 8 per cent of the total glycol and glycerol (or below about 4 mol per cent of the reaction mixture), it is possible, by conducting the esterification carefully, to reach intrinsic viscosities of about 0.4 before the mixture gels. It is thus possible to produce cold drawing polyesters from reaction mixtures containing 4 mol per cent or less of glycerol.

However, as indicated above, the most desirable properties in the polyesters appear only at considerably higher intrinsic viscosities than those necessary for the incidence of cold drawing. Therefore, in the reaction mixtures with which the drawing is concerned, it is desirable to limit the amount of glycerol to less than 2.5 mol per cent of the reaction mixture in order that these higher intrinsic viscosities may be attained. From the curve is appears that if the amount of glycerol present is limited to less than about 1 mol per cent of the reaction mixture, it is possible to obtain polyesters having molecular weights as high as would ordinarily be desired. With even less than 1 mol per cent of glycerol, the desirable results of the present invention may be achieved. Although there is no sharp lower limit to the amount of glycerol which will impart desirable properties to the polyesters of the present invention, it will be desirable in general to employ more than about .025 mol per cent.

Similar results may be obtained by preparing polyesters with other compounds containing more than two functional groups in place of glycerol. Thus, tricarballylic acid, diethanolamine, triethanolamine or diethylene triamine as well as starches, sugars and other polyfunctional compounds may be substituted for glycerol in the above-described reaction mixture. For the trifunctional compounds the same limits of mol percentage as described above for glycerol will be found applicable. However, inasmuch as the degree of cross-linking is directly proportional to the number of functional groups in excess of two, the tetrafunctional compounds will have twice as great a cross-linking effect as the trifunctional compounds. Therefore, the limits described above for the trifunctional compounds should be reduced to one-half for the tetrafunctional compounds. Similarly, for those compounds having an even greater number of functional groups, the limits described above for trifunctional compounds should be divided by the number of functional groups in excess of two possessed by the cross-linking compound.

Any suitable dicarboxylic acid may be used in place of succinic acid for the purpose of producing the polymers of the present invention. In general, the most desirable dicarboxylic acids are straight chain, aliphatic, dicarboxylic acids of the general formula COOH $(CH_2)_n$ COOH where $n$ is an integer. Among such acids may be mentioned glutaric acid, adipic acid, pimelic acid, suberic acid, azelaic acid, sebacic acid, decamethylene dicarboxylic acid, duodecamethylene dicarboxylic acid and octadecanedioic acid. Any other dicarboxylic acid may be used which is capable of reacting with a glycol to form a micro-crystalline linear polyester.

Any suitable glycol may be used in place of ethylene glycol. The most suitable glycols are the straight chain aliphatic glycols of the general formula HO $(CH_2)_{n_1}$ OH where $n_1$ is an integer. Among such glycols may be mentioned propylene glycol, hexamethylene glycol and decamethylene glycol. Any other glycol which is capable of reacting with a dicarboxylic acid to produce a micro-crystalline polyester may be employed.

It can be seen from the drawing that when a sufficiently small amount of cross-linking compound is employed to permit the formation of a polymer having an intrinsic viscosity greater than 0.4, it is possible to continue the esterification even further until gelation occurs. In this way it is possible to produce polymers having the characteristic, toughness and strength of the high molecular weight linear polymers and still having the desirable properties of infusibility and insolubility possessed by the thermoset resins.

Where it is desired to produce a thermoset resin of this type, this result may be more easily achieved by adding to the reaction mixture a small amount of a dicarboxylic acid containing olefinic unsaturation, such as maleic acid. In general, the amount of maleic acid should be less than 10 mol per cent and preferably less than 5 mol per cent of the total dicarboxylic acid. In place of maleic acid other unsaturated acids, such as fumaric, itaconic, citraconic, muconic, dihydromuconic or glutaconic may be employed. The polyesters so produced contain a small amount of unsaturation in their molecules. When they are treated with an organic peroxide, such as benzoyl peroxide, cross-linking of the molecules, apparently at the double bonds, takes place, causing gelation.

The following specific examples will serve to illustrate the manner in which the practice of the present invention may be carried on.

*Example 1*

1.05 mols of ethylene glycol, 1 mol of purified succinic acid and .02 mols of glycerin were placed in a glass reaction vessel and heated to 200° C. The reaction mixture was maintained at this temperature for 30 hours with a stream of dry, oxygen-free hydrogen bubbling through the mixture. The product removed from the reaction vessel at the end of this time was a hard, tough, relatively flexible, opaque solid having a definite crystalline melting point and melting into a semi-viscous liquid. In the liquid state the product could be formed into thin fibers which could be readily cold drawn to form strong pliable fibers. When cooled from the molten state to below the crystalline melting point the polyester crystallized slowly. However, instantaneous crystallization could be induced by mechanical working of the polymer, as by rolling or stretching.

*Example 2*

A polyester was prepared as described in Example 1 except that sebacic acid was substituted in the same mol proportion for the succinic acid. The product was similar in its properties except that it was less hard.

*Example 3*

1.05 mols of ethylene glycol, .98 mol of succinic acid, .02 mol of maleic acid and .02 mol of glycerol were heated in a glass reaction vessel to 200° C. and maintained at this temperature for 9 hours, while a stream of dry hydrogen gas was continuously bubbled through the mixture. After a large portion of the water of the reaction together with a portion of the free glycol had been removed from the reaction mixture by this procedure, the remaining substances were of sufficiently high molecular weight to permit subsequent heating under a vacuum without excessive volatilization. The reaction vessel was then evacuated, while allowing sufficient hydrogen to enter the system through a needle valve to agitate the reactants and maintain an absolute pressure of .5 centimeters of mercury. At the end of 8 hours atmosphere pressure was reestablished by the addition of hydrogen and 3 grams of hydroquinone were added to retard subsequent oxidation of the reaction mixture upon exposure to the air. The product was a white, tough, flexible micro-crystalline material capable of being cold drawn. A portion of this product was melted and then allowed to super-cool to 90° C., at which temperature 1 per cent of finely divided benzoyl peroxide was incorporated by thorough mixing. The resulting mixture was heated for 5 minutes at 150° C. to cause cross-linking. A transparent gel resulted which on cooling crystallized to a hard, flexible, opaque product.

Inasmuch as the polymers of the present invention posses the desirable properties of strength and toughness possessed by the strictly linear polyesters of extremely high molecular weight, they are capable of being used for all of the purposes hitherto suggested for the linear polyesters. Thus they may be drawn into very satisfactory fibers and may be used for injection and other types of molding procedures. They are desirable for forming enamel type coatings on electrical conductors and are desirable for impregnating textile fabric coverings used on electrical conductors intended for outdoor use. Other uses will be apparent to those skilled in the art. It is obvious that the products of the present invention need not be used alone but may be mixed with plasticizers, natural or synthetic resins, pigments, dyes and other modifying ingredients.

Although the invention has been described in terms of its specific embodiments, certain modifications and equivalents will be apparent to those skilled in the art and are intended to be included as a part of the invention which is to be limited only by the reasonable scope of the appended claims.

What is claimed is:

1. A cold drawing polyester produced by esterifying a glycol made up of two hydroxyl groups joined by a divalent straight chain aliphatic hydrocarbon polymethylene radical with a dicarboxylic acid made up of two carboxyl groups joined by a divalent straight chain aliphatic hydrocarbon polymethylene radical in the presence of at least about .025 mol per cent but less than about 1 mol per cent glycerin based on the total reaction mixture, and continuing said reaction until a cold drawing polyester is produced.

2. A microcrystalline polyester produced by esterifying a glycol, made up of two hydroxyl groups joined by a divalent straight-chain aliphatic hydrocarbon polymethylene radical, with a dicarboxylic acid, made up of two carboxyl groups joined by a divalent straight-chain aliphatic hydrocarbon polymethylene radical, in the presence of at least about .025 mol per cent but less than about 4 mol per cent glycerine based on the total reaction mixture and continuing said reaction until a polyester capable of being cold drawn into oriented fibres is produced.

3. The polyester described in claim 1 wherein the glycol is ethylene glycol and the dicarboxylic acid is sebacic acid.

4. The polyester described in claim 1 wherein the glycol is ethylene glycol and the dicarboxylic acid is succinic acid.

CARL J. FROSCH.